United States Patent
Carlson et al.

(10) Patent No.: US 7,085,786 B2
(45) Date of Patent: Aug. 1, 2006

(54) APPARATUS AND METHOD TO SCHEDULE AND PERFORM DATABASE MAINTENANCE

(75) Inventors: Wayne Charles Carlson, Tucson, AZ (US); James Arthur Fisher, Tucson, AZ (US); Kerri Renee Shotwell, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 588 days.

(21) Appl. No.: 10/151,372

(22) Filed: May 20, 2002

(65) Prior Publication Data

US 2003/0217078 A1 Nov. 20, 2003

(51) Int. Cl.
G06F 17/30 (2006.01)

(52) U.S. Cl. ...................... 707/204; 707/202
(58) Field of Classification Search ............... 707/1, 707/2, 3, 4, 8, 9, 10, 100, 101, 102, 104.1, 707/202, 203, 204, 200, 201; 706/45; 702/1, 702/182
See application file for complete search history.

(56) References Cited

U.S. PATENT DOCUMENTS

| | | | |
|---|---|---|---|
| 4,849,879 A | 7/1989 | Chinnaswamy et al. ...... 706/45 |
| 5,062,055 A | 10/1991 | Chinnaswamy et al. .... 702/182 |
| 5,646,871 A | 7/1997 | Cadot ........................ 702/1 |
| 5,787,409 A | 7/1998 | Seiffert et al. .............. 706/45 |
| 5,822,780 A * | 10/1998 | Schutzman ................. 711/165 |
| 6,035,306 A | 3/2000 | Lowenthal et al. ......... 707/200 |
| 6,266,679 B1 * | 7/2001 | Szalwinski et al. ......... 707/204 |
| 6,704,885 B1 * | 3/2004 | Salas-Meza et al. ........... 714/6 |
| 6,785,786 B1 * | 8/2004 | Gold et al. ................. 711/162 |
| 6,847,984 B1 * | 1/2005 | Midgley et al. ............ 707/204 |

FOREIGN PATENT DOCUMENTS

JP 10-030179 2/1998

\* cited by examiner

Primary Examiner—Jeffrey Gaffin
Assistant Examiner—Yicun Wu
(74) Attorney, Agent, or Firm—Dale F. Regelman

(57) ABSTRACT

A method to schedule and perform database maintenance, where the database includes information regarding one or more information storage media moveably disposed in a data storage and retrieval system, which includes selecting a first time period, commencing that first time period at a first time and ending that first time period at a third time, performing one or more database queries during that first time period, recording the number of database queries performed during each of the two or more first time intervals, determining the least utilized first time interval where that least utilized first time interval commenced at a second time, calculating a first time difference between the first time and the second time, and scheduling database maintenance at a fourth time. A data storage and retrieval system comprising a computer useable medium having computer readable program code disposed therein to implement Applicants' method to schedule and perform database maintenance. A computer program product usable with a programmable computer processor having computer readable program code embodied therein to implement Applicants' method to schedule and perform database maintenance.

20 Claims, 11 Drawing Sheets

| | FIRST TIME PERIOD (j) = 1 | | SECOND TIME PERIOD (j) = 2 | | THIRD TIME PERIOD (j) = 1 | |
|---|---|---|---|---|---|---|
| (i) | T(i)(1) | R(i)(1) | T(i)(2) | R(i)(2) | T(i)(3) | R(i)(3) |
| 1 | 0000 | 500 | 0000 | 500 | 0000 | 500 |
| 2 | 0030 | 600 | 0030 | 600 | 0030 | 600 |
| 3 | 0100 | 500 | 0100 | 500 | 0100 | 500 |
| 4 | 0130 | 600 | 0130 | 600 | 0130 | 600 |
| 5 | 0200 | 500 | 0200 | 500 | 0200 | 500 |
| 6 | 0230 | 750 | 0230 | 750 | 0230 | 750 |
| 7 | 0300 | 500 | 0300 | 500 | 0300 | 500 |
| 8 | 0330 | 600 | 0330 | 600 | 0330 | 600 |
| 9 | 0400 | 750 | 0400 | 750 | 0400 | 750 |
| 10 | 0430 | 500 | 0430 | 500 | 0430 | 500 |
| 11 | 0500 | 750 | 0500 | 750 | 0500 | 750 |
| 12 | 0530 | 600 | 0530 | 750 | 0530 | 400 |
| 13 | 0600 | 400 | 0600 | 400 | 0600 | 500 |
| 14 | 0630 | 300 | 0630 | 300 | 0630 | 400 |
| 15 | 0700 | 400 | 0700 | 400 | 0700 | 375 |
| 16 | 0730 | 600 | 0730 | 600 | 0730 | 300 |
| 17 | 0800 | 500 | 0800 | 500 | 0800 | 500 |
| 18 | 0830 | 600 | 0830 | 600 | 0830 | 600 |
| 19 | 0900 | 500 | 0900 | 500 | 0900 | 500 |
| 20 | 0930 | 750 | 0930 | 750 | 0930 | 750 |
| 21 | 1000 | 500 | 1000 | 750 | 1000 | 600 |
| 22 | 1030 | 600 | 1030 | 750 | 1030 | 600 |
| 23 | 1100 | 750 | 1100 | 750 | 1100 | 750 |
| 24 | 1130 | 500 | 1130 | 500 | 1130 | 500 |

FIG. 5B

| | | | | | | |
|---|---|---|---|---|---|---|
| 25 | 1200 | 600 | 1200 | 600 | 1200 | 600 |
| 26 | 1230 | 500 | 1230 | 500 | 1230 | 500 |
| 27 | 1300 | 600 | 1300 | 600 | 1300 | 600 |
| 28 | 1330 | 500 | 1330 | 500 | 1330 | 500 |
| 29 | 1400 | 750 | 1400 | 750 | 1400 | 750 |
| 30 | 1430 | 500 | 1430 | 500 | 1430 | 500 |
| 31 | 1500 | 600 | 1500 | 600 | 1500 | 600 |
| 32 | 1530 | 600 | 1530 | 600 | 1530 | 600 |
| 33 | 1600 | 500 | 1600 | 500 | 1600 | 500 |
| 34 | 1630 | 750 | 1630 | 750 | 1630 | 750 |
| 35 | 1700 | 600 | 1700 | 600 | 1700 | 600 |
| 36 | 1730 | 500 | 1730 | 500 | 1730 | 500 |
| 37 | 1800 | 600 | 1800 | 600 | 1800 | 600 |
| 38 | 1830 | 500 | 1830 | 500 | 1830 | 500 |
| 39 | 1900 | 750 | 1900 | 750 | 1900 | 750 |
| 40 | 1930 | 750 | 1930 | 750 | 1930 | 750 |
| 41 | 2000 | 500 | 2000 | 500 | 2000 | 500 |
| 42 | 2030 | 600 | 2030 | 600 | 2030 | 600 |
| 43 | 2100 | 500 | 2100 | 500 | 2100 | 500 |
| 44 | 2130 | 750 | 2130 | 750 | 2130 | 750 |
| 45 | 2200 | 600 | 2200 | 600 | 2200 | 600 |
| 46 | 2230 | 500 | 2230 | 500 | 2230 | 500 |
| 47 | 2300 | 500 | 2300 | 500 | 2300 | 500 |
| 48 | 2330 | 600 | 2330 | 600 | 2330 | 600 |
| 501 | 502 | 503 | 504 | 505 | 506 | 507 |

| ACCESS REQUEST NUMBER | ACTUAL ACCESS TIME | PREDICTED ACCESS TIME |
|---|---|---|
| 1 | 1.10 | 1.21 |
| 2 | 2.30 | 1.25 |
| 3 | 1.20 | 1.29 |
| 4 | 1.40 | 1.34 |
| 5 | 1.30 | 1.38 |
| 6 | 1.30 | 1.42 |
| 7 | 1.20 | 1.46 |
| 8 | 1.40 | 1.50 |
| 9 | 1.40 | 1.54 |
| 10 | 1.50 | 1.58 |
| 11 | 2.00 | 1.63 |
| 12 | 1.20 | 1.67 |
| 13 | 1.40 | 1.71 |
| 14 | 1.50 | 1.75 |
| 15 | 1.80 | 1.79 |
| 16 | 1.90 | 1.83 |
| 17 | 1.30 | 1.87 |
| 18 | 2.10 | 1.91 |
| 19 | 2.20 | 1.96 |
| 20 | 2.00 | 2.00 |
| 21 | 2.30 | 2.04 |
| 22 | 2.10 | 2.08 |
| 23 | 2.40 | 2.12 |
| 24 | 1.90 | 2.16 |

FIG. 8B

| 810 | 820 | 830 |
|---|---|---|
| 25 | 2.50 | 2.20 |
| 26 | | 2.25 |
| 27 | | 2.29 |
| 28 | | 2.33 |
| 29 | | 2.37 |
| 30 | | 2.41 |
| 31 | | 2.45 |
| 32 | | 2.49 |
| 33 | | 2.54 |
| 34 | | 2.58 |
| 35 | | 2.62 |
| 36 | | 2.66 |
| 37 | | 2.70 |
| 38 | | 2.74 |
| 39 | | 2.78 |
| 40 | | 2.83 |
| 41 | | 2.87 |
| 42 | | 2.91 |
| 43 | | 2.95 |
| 44 | | 2.99 |
| 45 | | 3.03 |
| 46 | | 3.07 |
| 47 | | 3.12 |
| 48 | | 3.16 |
| 49 | | 3.20 |
| 50 | | 3.24 |

800

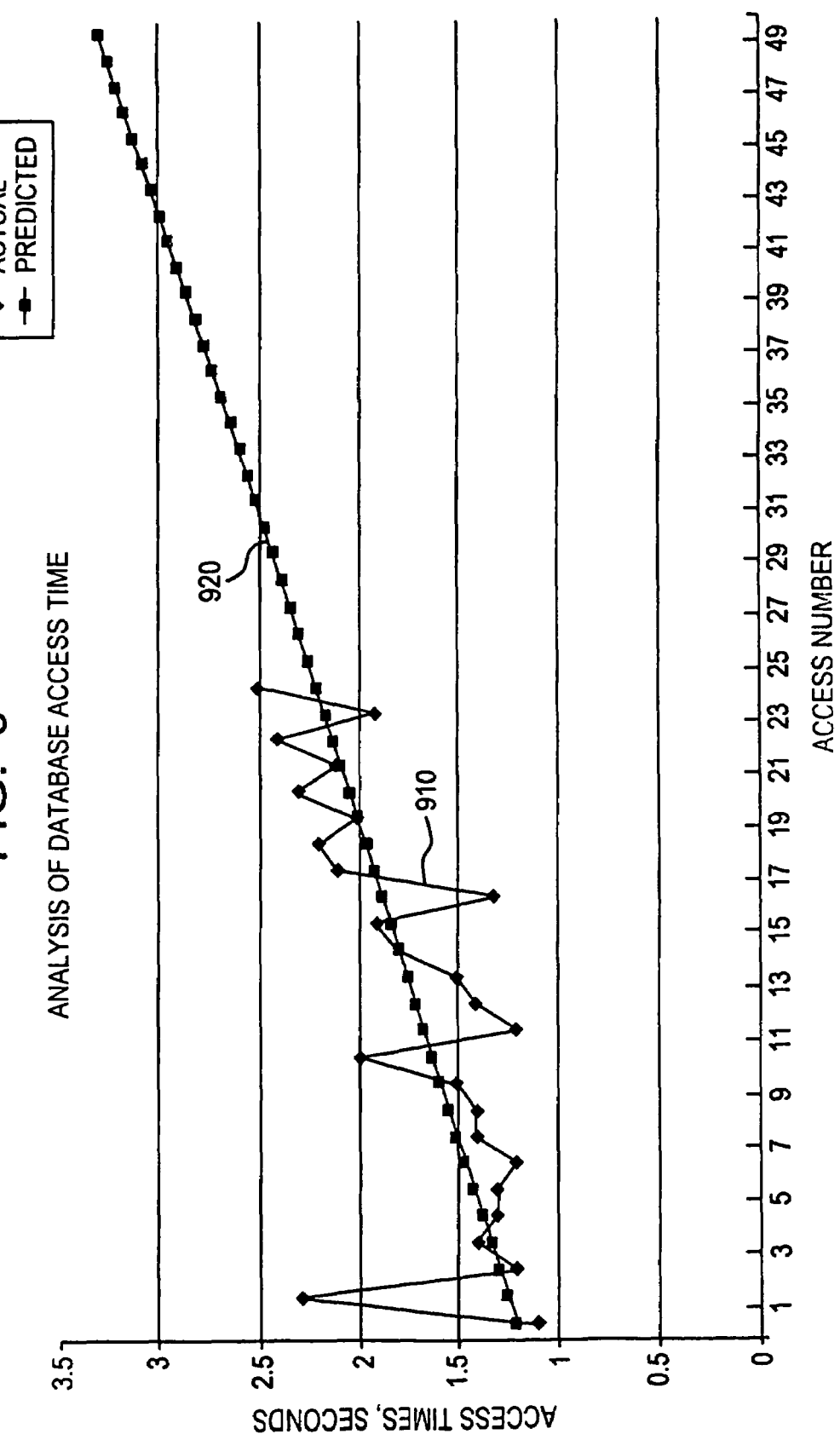

APPARATUS AND METHOD TO SCHEDULE AND PERFORM DATABASE MAINTENANCE

FIELD OF THE INVENTION

Applicant's invention relates to an apparatus and method to perform scheduled and unscheduled maintenance of a database disposed in a data storage and retrieval system.

BACKGROUND OF THE INVENTION

Automated media storage libraries are known for providing cost effective access to large quantities of stored information. Generally, media storage libraries include a large number of storage slots in which are stored portable data storage media. The typical portable data storage media is a tape cartridge, an optical cartridge, a disk cartridge, electronic storage media, and the like. By electronic storage media, Applicants mean a device such as a PROM, EPROM, EEPROM, Flash PROM, and the like.

One (or more) accessors typically accesses the data storage media from the storage slots and delivers the accessed media to a data storage device for reading and/or writing data on the accessed media. Suitable electronics operate the accessor(s) and operate the data storage device(s) to provide information to, and/or to receive information from, an attached on-line host computer system.

In a conventional automated media storage library, the storage slots are arranged in a planar orthogonal arrangement forming a "wall" of storage slots for holding data storage media. The plane may be a flat plane, or may be a cylindrical plane. To double the storage capacity, two "walls" of storage slots may be provided on either side of the accessor.

A number of different companies manufacture automated media storage libraries today, each model displaying various different features. One example is the IBM 3494 Tape Library Data Server. Some of the automated media storage libraries have dual or multiple accessors to provide a level of redundancy and to enhance performance.

In operation, one or more host computers provide requests to the data storage and retrieval system to mount one or more information storage media in one or more data storage devices disposed therein. On occasion, however, the requesting host computer does not specify which one or more physical/logical volumes comprise the designated media. Rather, the host specifies a category of media. Such a host request is sometimes called a "category mount".

In response to such a category mount, the data storage and retrieval system queries its database using the categorical information supplied by the requesting host computer to identify the physical/logical volume(s) wherein the requested information is stored. During normal operation, volumes are moved from category to category. Over time this causes database fragmentation resulting in slower database performance.

Optimal database performance is desirable due to the number of volumes typically stored in the library, and due to the round-the-clock use, i.e. "24/7" operation, of the data storage and retrieval system. Prior art database maintenance methods require human intervention to monitor database performance and to undertake database maintenance. In addition, prior art database maintenance methods do not include performing unscheduled maintenance.

SUMMARY OF THE INVENTION

Applicants' invention includes a data storage and retrieval system comprising a database which includes information regarding one or more portable information storage media disposed in that system. Such database information includes, for example, database statistics, database indices, and the like. Applicants' invention comprises a method to schedule database maintenance, which includes the steps of selecting a first time period, where that first time period comprises two or more first time intervals; commencing that first time period at a first time and ending that first time period at a third time; performing one or more database queries during that first time period; recording the number of database queries performed during each of the two or more first time intervals; determining the least utilized first time interval, where that least utilized first time interval comprises the one of said two or more first time intervals during which the fewest database inquiries were performed, where that least utilized first time interval commenced at a second time; calculating a first time difference between the first time and the second time; and scheduling database maintenance at a fourth time, where that fourth time equals the third time plus the first time difference.

Applicants' invention further includes a method to monitor database performance and to perform database maintenance if recent database access times exceed a threshold value, where that database comprises information regarding one or more information storage media moveably disposed in a data storage and retrieval system. Applicants' method includes the steps of receiving category mount requests from one or more host computers, determining and storing access times for each of those category mount requests, calculating an average access time for the previous (N) database queries, setting a maximum access time, comparing the average access time to the maximum access time, and performing database maintenance if the average access time exceeds the maximum access time.

Applicants' invention further includes a method to opportunistically perform database maintenance during operating system start-up, where the database comprises one or more indices regarding one or more portable information storage media disposed in a data storage and retrieval system, and where that data storage and retrieval system includes an operating system, comprising the steps of starting the operating system, determining if database performance is acceptable, and performing database maintenance if database performance is not acceptable.

BRIEF DESCRIPTION OF THE DRAWINGS

The invention will be better understood from a reading of the following detailed description taken in conjunction with the drawings in which like reference designators are used to designate like elements, and in which:

FIG. 5 is a table reciting database access times for database queries performed during a plurality of time intervals throughout a plurality of time periods;

FIG. 8 is a table reciting access times for a plurality of database queries; and FIG. 9 graphically depicts the data of FIG. 8.

DETAILED DESCRIPTION OF THE PREFERRED EMBODIMENTS

Referring to the illustrations, like numerals correspond to like parts depicted in the figures. The invention will be described as embodied in an automated data storage and retrieval subsystem for use in a data processing environment. The following description of Applicant's method to schedule and/or perform database maintenance is not meant, however, to limit Applicant's invention to either data storage and retrieval systems, or to data processing applications, as the invention herein can be applied to computer database management in general.

Figure 3:
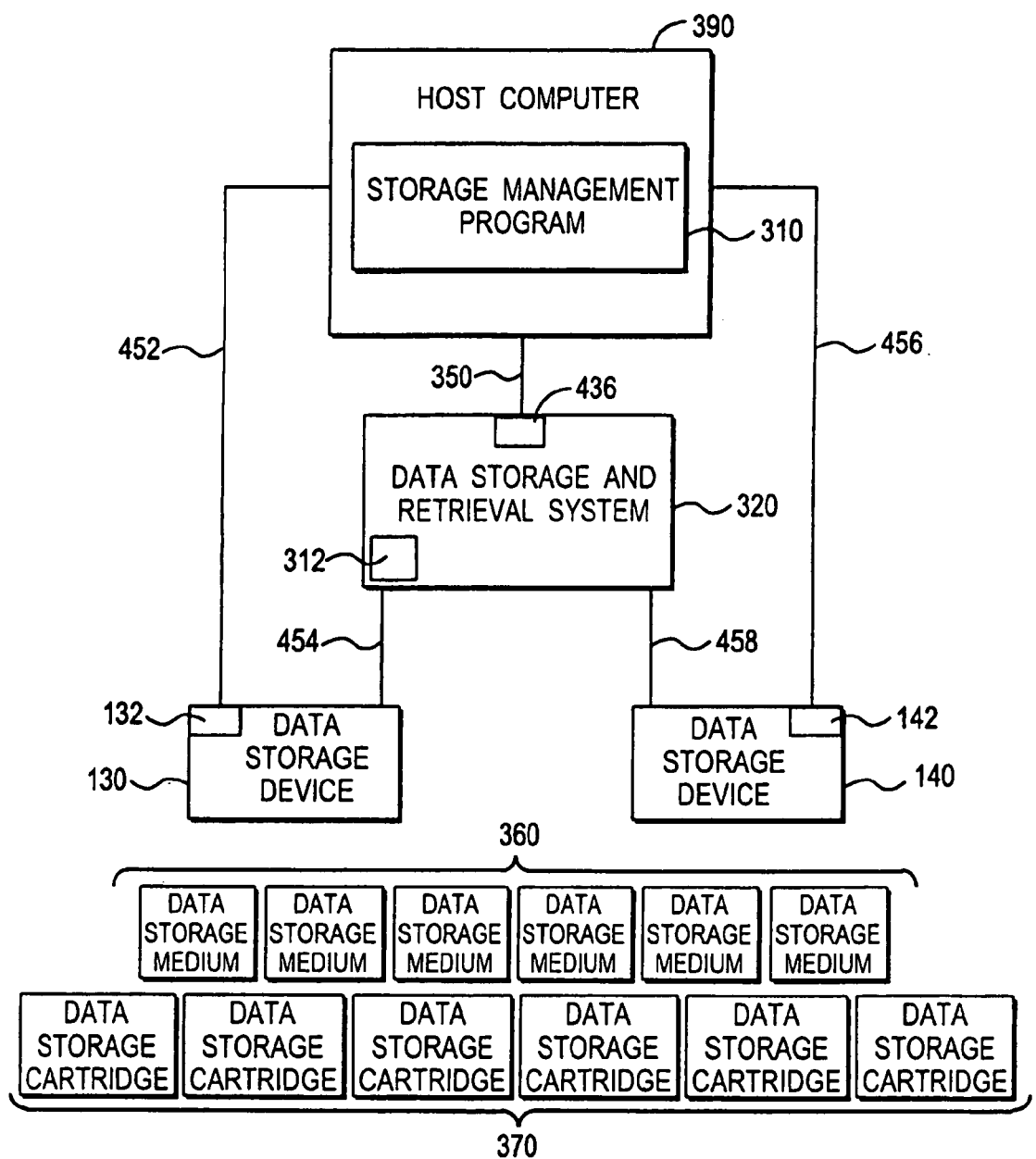
FIG. 3 is a block diagram showing the components of Applicants' data storage and retrieval system.

FIG. 3 illustrates the hardware and software environment in which preferred embodiments of the present invention are implemented. Host computer 390 includes, among other programs, a storage management program 310. In certain embodiments, storage management program 310 includes library database 312. In certain embodiments, host computer 390 comprises a single computer. In alternative embodiments, host computer 390 comprises one or more mainframe computers, one or more work stations, one or more personal computers, combinations thereof, and the like.

Information is transferred between the host system 390 and secondary storage devices managed by a data storage and retrieval system, such as data storage and retrieval system 320, via communication links 350, 452, and 456. Communication links 350 452, and 456, comprise a serial interconnection, such as an RS-232 cable or an RS-422 cable, an ethernet interconnection, a SCSI interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, and combinations thereof.

Figure 1:
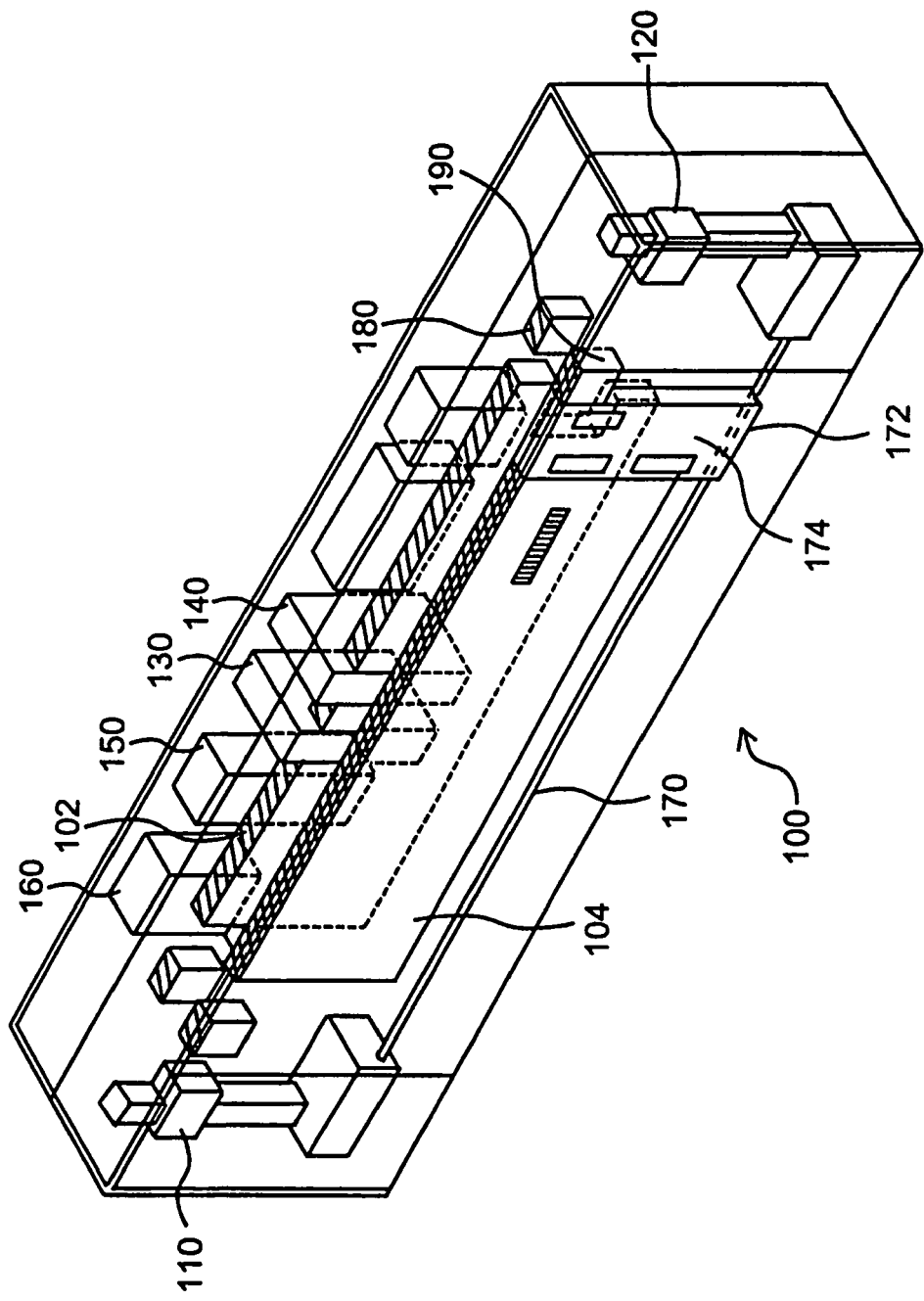
FIG. 1 is a perspective view of a first embodiment of Applicant's data storage and retrieval system.

In the embodiment shown in FIG. 3, data storage and retrieval system 320 includes data storage devices 130 (FIG. 1) and 140 (FIG. 1). In alternative embodiments, Applicants' data storage and retrieval system 320 includes more than two data storage devices. In alternative embodiments, Applicants' data storage and retrieval system 320 includes a single data storage device.

A plurality of portable data storage media 360 are moveably disposed within Applicants' data storage and retrieval system. In certain embodiments, the plurality of data storage media 360 are housed in a plurality of portable data storage cartridges 370. Each of such portable data storage cartridges may be removeably disposed in an appropriate data storage device.

Data storage and retrieval system 320 further includes program logic to manage data storage devices 130 and 140, and plurality of portable data storage cartridges 370. In alternative embodiments, data storage and retrieval system 320 and host system 390 may be collocated on a single apparatus.

Host system 390 comprises a computer system, such as one or more mainframe computers, one or more personal computers, one or more workstations, etc., which included one or more operating systems such as Windows, AIX, Unix, MVS, LINUX, etc. (Windows is a registered trademark of Microsoft Corporation; AIX is a registered trademark and MVS is a trademark of IBM Corporation; and UNIX is a registered trademark in the United States and other countries licensed exclusively through The Open Group.) The storage management program 310 in the host system 390 may include the functionality of storage management type programs known in the art that manage the transfer of data to a data storage and retrieval system, such as the IBM DFSMS implemented in the IBM MVS operating system.

The IBM DFSMS software is described in "DFSMS/MVS V1R4 General Information," IBM document no. GC26-4900-05, published by IBM (Copyright 1997, IBM), which publication is incorporated herein by reference in its entirety. In addition to including known storage management program functions, such as recall and migration. In certain embodiments, the storage management program further includes additional program instructions to perform the operations of the preferred embodiments of the present invention. The storage management program 310 may be implemented within the operating system of the host system 390 or as a separate, installed application program. Alternatively, storage management program 310 may include device drivers, backup software, and the like.

The data storage and retrieval system 320 comprises a computer system, and manages, for example, one or more of data storage devices and one or more information storage media. In certain embodiments, data storage and retrieval system 320 includes the library database 312. In certain embodiments, data storage and retrieval system 320 comprises a tape library which includes a plurality of tape drives and a plurality of tape cartridges. In such tape drive embodiments, tape drives 130 and 140 may be any suitable tape drives known in the art, e.g., the Magstar 3590 tape drives. (Magstar is a registered trademark of IBM Corporation). Similarly, tape cartridges 370 may be any suitable tape cartridge device known in the art, such as ECCST, Magstar, IBM 3420, 3480, 3490E, 3590 tape cartridges, etc.

Referring now to FIG. 1, automated data storage and retrieval system 100 is shown having a first wall of storage slots 102 and a second wall of storage slots 104. Portable data storage media are individually stored in these storage slots. In certain embodiments, such data storage media are individually housed in portable container, i.e. a cartridge. Examples of such data storage media include magnetic tapes, magnetic disks of various types, optical disks of various types, electronic storage media, and the like.

Applicant's automated data storage and retrieval system includes one or more accessors, such as accessors 110 and 120. An accessor is a robotic device which retrieves portable data storage media from, for example, first storage wall 102 or second storage wall 104, transports that accessed media to, for example, a data storage device 130/140 for reading and/or writing data thereon, and returns the media to a proper storage slot. As shown in FIG. 1, accessors 110 and 120 travel bi-directionally along rail 170 in an aisle disposed between first wall of storage slots 102 and second wall of storage slots 104.

In certain embodiments, device 160 comprises a library controller. In certain of these embodiments, library controller 160 is integral with a computer. In certain embodiments, library controller 160 includes the library database 312. In other embodiments, Applicants' data storage and retrieval system utilizes a distributed control network. In these distributed control network embodiments, each accessor includes an accessor controller. In certain embodiments, the library database 312 is stored in one or more accessor controllers.

Referring again to FIG. 1, operator input station 150 permits a user to communicate with Applicant's automated data storage and retrieval system 100. Power component 180 and power component 190 each comprise one or more power supply units which supply power to the individual components disposed within Applicant's automated data storage and retrieval system. Import/export station 172 includes access door 174 pivotably attached to the side of system 100. Portable data storage cartridges can be placed in the system, or in the alternative, removed from the system, via station 172 and access door 174.

Figure 2:
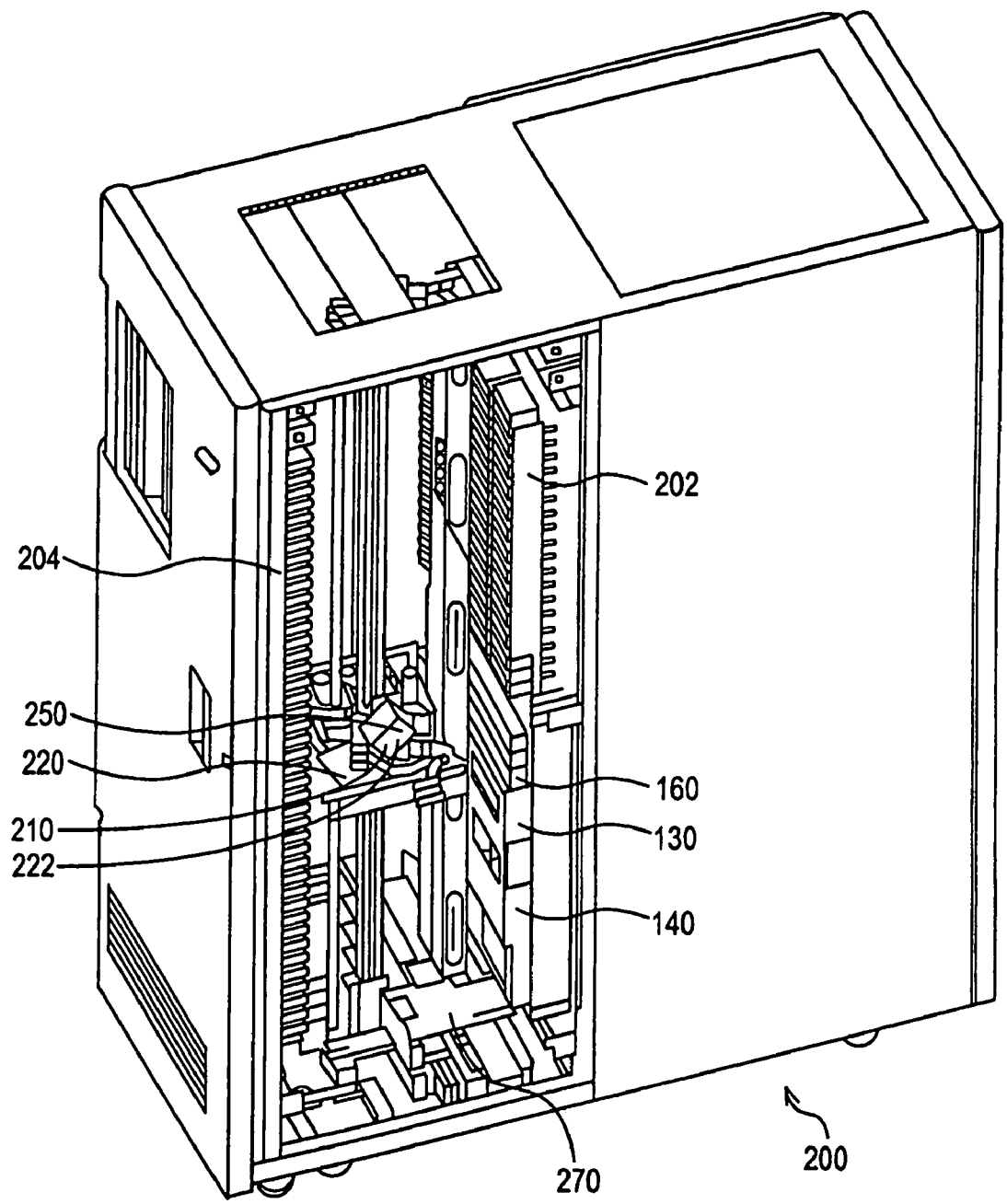
FIG. 2 is a perspective view of a second embodiment of Applicant's data storage and retrieval system.

FIG. 2 shows system 200 which comprises another embodiment of Applicant's data storage and retrieval system. System 200 includes first storage wall 202 and second storage wall 204. Storage walls 202 and 204 each include a plurality of storage elements in which can be stored a plurality of portable data storage media. System 200 includes one or more data storage devices, such as devices 130 and 140. Data storage device 130/140 each comprise a floppy disk drive, an optical disk drive, a magnetic tape drive, and the like. System 200 further includes controller 160. In certain embodiments, the library database 312 is disposed in controller 160.

System 200 further includes one or a plurality of portable data storage cartridges, such as cartridges 370 (FIG. 3), removeably disposed in one or more slots in storage walls 202/204. Each such cartridge contains a data storage medium, i.e. one of data storage media 360 (FIG. 3), internally disposed therein. Such data storage media includes optical media, magnetic media, tape media, electronic media, and combinations thereof.

System 200 also includes at least one robotic accessor 210 for transporting a designated portable data storage medium between a storage slot disposed in first wall 202 or second wall 204 and data storage device 130/140. Accessor 210 includes lifting servo section 220 on which is disposed at least one cartridge gripping mechanism 222 and, in certain embodiments, accessor control card 250. In certain embodiments, accessor 210 further includes X/Y movement control card 270.

Figure 4:
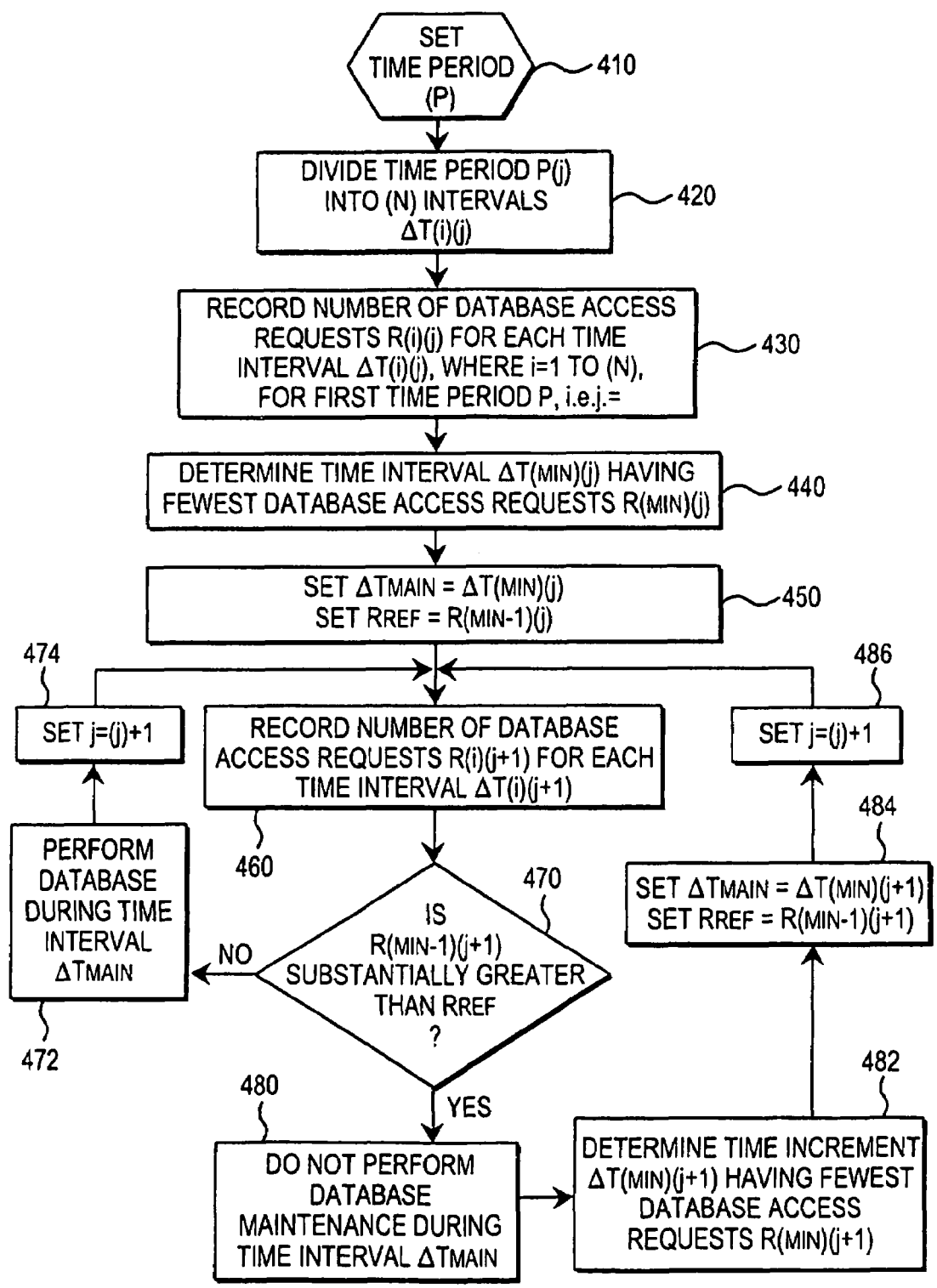
FIG. 4 is a flowchart summarizing the steps in Applicants' method to schedule database maintenance.

FIG. 4 summarizes the steps in Applicants' method to schedule and perform database maintenance. In step 410, Applicants' method selects a time period (P). In certain embodiments, step 410 is performed by a storage management program. In certain embodiments, step 410 is performed by a library controller. In certain embodiments, step 410 is performed by one or more accessor controllers. In certain embodiments, time period (P) equals twenty-fours.

In step 420, the selected time period is divided into (N) time intervals. In certain embodiments, step 420 is performed by a storage management program. In certain embodiments, step 420 is performed by a library controller. In certain embodiments, step 420 is performed by one or more accessor controllers. In certain embodiments, (N) equals 48. In certain embodiments, (N) is greater than 48. In certain embodiments, (N) is less than 48.

In certain embodiments, the value of (P) and/or (N) is set by the user during system configuration. In certain embodiments, the value of (P) and/or (N) is set in "firmware" by the manufacturer. In certain embodiments, the value of (P) and/or (N) is selected by a host computer. In certain embodiments, the value of (P) and/or (N) is selected by a storage management program. In certain embodiments, the value of (P) and/or (N) is selected by a library controller. In certain embodiments, the value of (P) and/or (N) is selected by one or more accessor controllers.

Referring to the embodiment shown in FIG. 5, (N) equals 48, (P) equals 24 hours, and therefore, each increment (i) equals thirty minutes. In the embodiment shown in FIG. 5, the first time increment $T_1$, i.e. (i)=1, commences at time "0000". In certain embodiments, time "0000" corresponds to midnight Greenwich Mean Time ("GMT"). In certain embodiments, time "0000" corresponds to midnight local time. In certain embodiments, time "0000" is arbitrarily set to correspond to any certain value of GMT and/or local time.

In step 430, Applicants' method records the number of database access requests received during a first time period in each of the (N) time intervals. For example in the embodiment of FIG. 5 where (N) is set to 48, in step 430 the number of database access requests R(i)(1) are recorded in Column 503 (FIG. 5) for each time interval $\Delta T(i)(1)$ in Column 502 (FIG. 5), where (i) is an integer greater or equal to 1 and less than or equal to 48.

Referring again to FIG. 5, Table 500 recites values of each of R(i)(j) for illustrative purposes, where (i) and (j) are as defined above. The values of R(i)(j) recited in Table 5 should not be construed as reflecting actual or anticipated database access requests for a system in operation. Referring to Table 500, time increment $T_{(1)(1)}$ comprises the time interval commencing at time 0000 and ending at time 0029 during the first time period. For illustrative purposes, Table 500 indicates, for example, that the number of database access requests received during time $T_{(1)(1)}$, i.e. $R_{(1)(1)}$, equals 500.

In step 440, Applicants' method determines the time interval $\Delta T_{MIN(j)}$ having the fewest database access requests during time period (j). In the embodiment shown in FIG. 5, time interval $\Delta T_{(14)(1)}$, designated as cell 510 in FIG. 5, comprises the time increment wherein the fewest database access requests $R_{(14)(1)}$, designated as cell 515 in FIG. 5, were received during the first time period, i.e. (j)=1. Therefore for the embodiment shown in FIG. 5, Applicants' method in step 440 sets $\Delta T_{(MIN)(1)}$ to 0630. The time interval immediately preceding $\Delta T_{(MIN)(1)}$, i.e. time interval $\Delta T_{(13)(1)}$ (shown in FIG. 5 as time interval 520), comprises time interval $\Delta T_{(MIN-1)(1)}$.

In step 450, Applicants' method sets the time interval in which database maintenance will be scheduled, i.e. $\Delta T_{MAIN}$, during the next time period to $\Delta T_{(MIN)(2)}$. In the embodiment shown in FIG. 5, Applicants' method in step 450 schedules maintenance for day 2 to be performed in the time interval $\Delta T_{(14)(2)}$. Further in step 450, Applicants' method sets the number of database access requests, $R_{(MIN-1)(1)}$, received during the time interval $T_{(MIN-1)(1)}$ to $_{RREF}$. In the embodiment of FIG. 5, Applicants' method sets $R_{REF}$ to 400 in step 450.

In step 460, starting at time "0000" of the second twenty-four hour period, i.e. (j)=2, Applicants' method records the number of database access requests $R_{(i)(2)}$ received for each time interval $\Delta T_{(i)(2)}$. As discussed above, $\Delta T_{MAIN}$ for time period (j+1) was set in step 450, which in the embodiment of FIG. 5 is $T_{(14)(2)}$. Thus in the embodiment of FIG. 5 for j=2, $\Delta T_{MAIN}$ is set to commence at 0630 which corresponds to the commencement of time interval $T_{(14)(2)}$.

In step 470, Applicants' method determines if the number of database access requests $R_{(MIN-1)(j+1)}$ received during time increment $\Delta T_{(MIN-1)(j+1)}$ is substantially greater than $R_{REF}$. By substantially greater, in certain embodiments Applicants mean that $R_{(MIN-1)(j+1)}$ exceeds $R_{REF}$ by at least twenty percent. By substantially greater, in certain embodiments Applicants mean that $R_{(MIN-1)(j+1)}$ exceeds $R_{REF}$ by at least fifteen percent. By substantially greater, in certain embodiments Applicants mean that $R_{(MIN-1)(j+1)}$ exceeds $R_{REF}$ by at least ten percent, i.e. $R_{(MIN-1)(j+1)}$ greater than about $1.1*R_{REF}$.

In the embodiment shown in FIG. 5, in step 470 Applicants' method determines if $R_{(13)(2)}$ is substantially greater than $R_{REF}$. For the embodiment shown in FIG. 5, $R_{REF}$ was previously set to 400. Because $R_{(13)(2)}$ also equals 400, then in step 470 Applicants' method determines that $R_{(MIN-1)(j+1)}$ is not greater than $R_{REF}$, and therefore, Applicants' method transitions from step 470 to step 472. This being the case, the time interval in which to perform database maintenance is not changed, and in step 472 the database maintenance for day 2 proceeds as scheduled during time interval $\Delta T_{MAIN}$. Applicants' method transitions from step 472 to step 474 wherein (j) is incremented to (j+1). Applicants' method transitions from step 474 to step 460, and Applicants' method proceeds as described herein.

In the event $R_{(MIN-1)(2)}$ is less than or equal to $R_{REF}$, then the historical usage of Applicants' data storage and retrieval system likely comprises an accurate predictor of the current usage. Therefore, if $R_{(MIN-1)(2)}$ is less than or equal to $R_{REF}$, then time interval $\Delta T_{MAIN}$ will likely comprise the time period wherein the minimum number of database access requests will be received. As those skilled in the art will appreciate, if $\Delta T_{MAIN}$ comprises the time interval wherein the minimum database access requests are made, then $\Delta T_{MAIN}$ comprises the optimal time to perform database maintenance operations.

If, on the other hand, $R_{(MIN-1)(j+1)}$ exceeds $R_{REF}$, then it is likely that $\Delta T_{MAIN}$, i.e. the time interval designated for maintenance to commence during the (j+1) time period will not comprise the time interval of minimum database usage. This being the case, the performance of Applicants' data storage and retrieval system could be unacceptably degraded if maintenance were performed during time interval $\Delta T_{MAIN}$.

Therefore in the event Applicants' method determines in step 470 that $R_{(MIN-1)(j+1)}$ is substantially greater than $R_{REF}$, then Applicants' method transitions to step 480 wherein the scheduled maintenance operations for time period (j+1) are canceled. In the embodiment of FIG. 5 for day 3, time interval $\Delta T_{(13)(3)}$ comprises time interval $\Delta T_{(MIN-1)(3)}$, and $R_{(13)(3)}$ comprises $R_{(MIN-1)(3)}$. Referring to Table 500, $R_{(13)(3)}$ equals 500. As discussed above, $R_{REF}$ was previously set to 400. Therefore in the embodiment of FIG. 5 for time period 3, $R_{(MIN-1)(3)}$ is twenty-five percent greater than $R_{REF}$. This being the case, Applicants' method determines in step 470 that $R_{(MIN-1)(3)}$ is substantially greater than $R_{REF}$, and Applicants' method transitions from step 470 to step 480. In step 480, for time period 3, Applicants' method cancels the scheduled maintenance operations.

Applicants' method transitions from step 480 to step 482 wherein Applicants' method determines the time increment $\Delta T_{MIN(j+1)}$ wherein the fewest database access requests $R_{(MIN)(j+1)}$ were received during day (j+1). Applicants' method transition from step 482 to step 484 wherein $\Delta T_{MAIN}$ is reset to $\Delta T_{MIN(j+1)}$. In the embodiment shown in FIG. 5, during the third time period $\Delta T_{(16)(3)}$ comprises the time interval wherein the fewest database access requests were received. Therefore for the embodiment shown in FIG. 5, Applicants' method in step 484 for day 3 resets $\Delta T_{MAIN}$ to $\Delta T_{MIN(3)}$, i.e. to 0730. Applicants' method in step 484 further resets $R_{REF}$ to $R_{(MIN-1)(3)}$, i.e. to $R_{(15)(3)}$ which equals 375. Applicants' method transitions from step 484 to step 486 wherein (j) is set to (j)+1.

In certain embodiments, one or more individual steps in Applicants' method recited in FIG. 4 may be combined, eliminated, or reordered. For example, one embodiment of Applicants' method includes steps 420, 430, 440, 450, 472, and 474.

Applicants' invention further includes an article of manufacture comprising a computer useable medium having computer readable program code disposed therein to schedule database maintenance, wherein the database comprises information relating to one or more information storage media disposed in a data storage and retrieval system. Applicants' data storage and retrieval systems 100 and 200 each comprise such an article of manufacture. Applicants' invention further includes a computer program product usable with a programmable computer processor having computer readable program code embodied therein to schedule database maintenance, wherein that database comprises information relating to one or more information storage media disposed in a data storage and retrieval system.

Applicants' invention further includes a method to monitor database performance between scheduled maintenance operations, and to perform database maintenance between scheduled maintenance intervals. A host computer may request Applicants' data storage and retrieval system mount one or more information storage media disposed in the system, but not specify which one or more physical/logical volumes comprise that media. Rather, the host specifies a category of media. Such a host request is sometimes called a "category mount".

Figure 6:
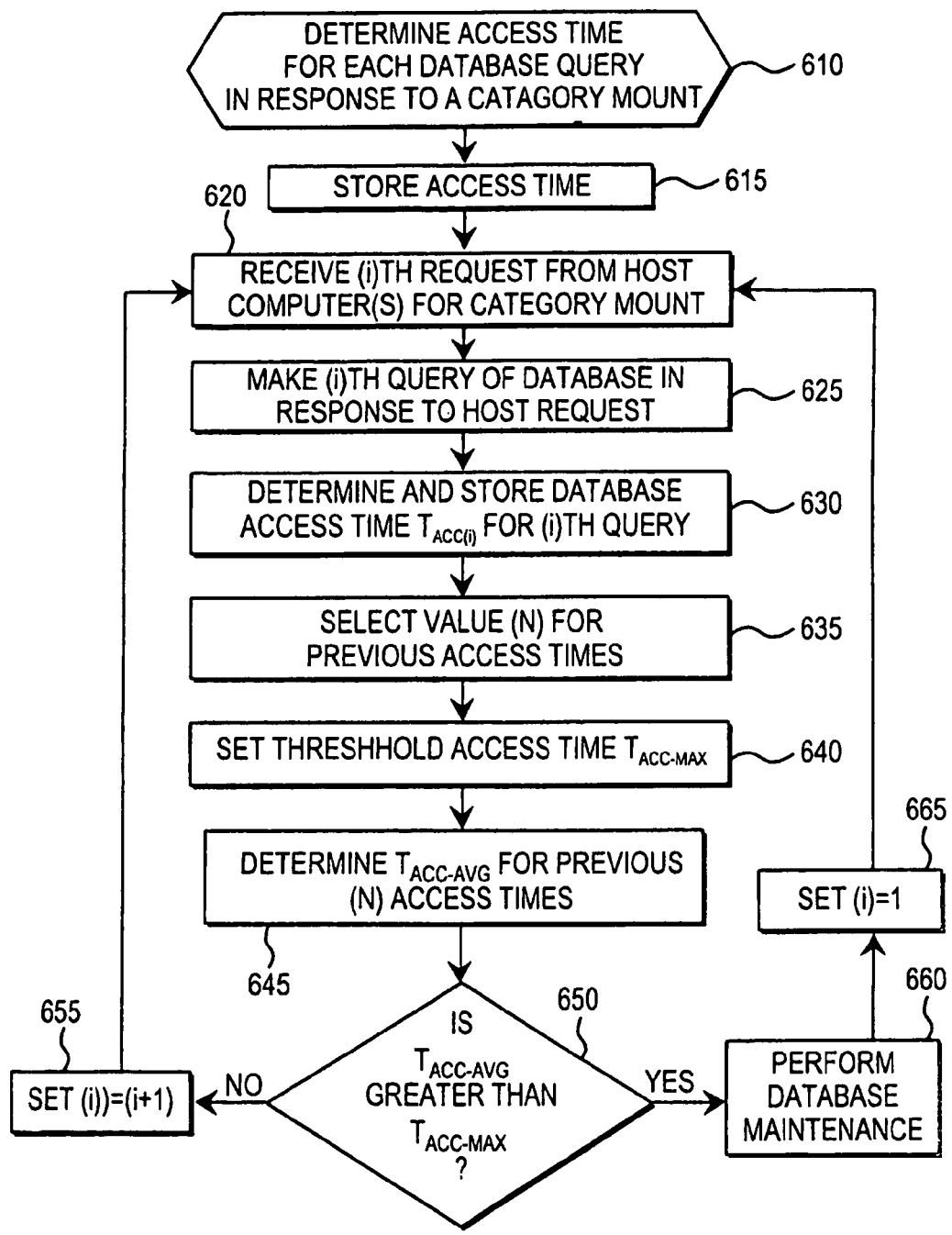
FIG. 6 is a flowchart summarizing the steps in one embodiment of Applicant's method to monitor database performance and to perform unscheduled database maintenance.

FIG. 6 summarizes the steps in a first embodiment of Applicants' method to implement unscheduled database maintenance operations. In step 610, Applicants' method determines the access time for each category mount request received. By access time, Applicants mean the time period required for the database to return information in response to a database query to identify one or more physical/logical volumes based upon certain categorical search information. In certain embodiments, a storage management program, such a storage management program 310 (FIG. 3), performs step 610. In certain embodiments, a library controller, such as controller 160 (FIG. 1), performs step 610. In certain embodiments, one or more accessor controllers perform step 610. In step 615, each of those access times are stored. In certain embodiments, a storage management program performs step 615. In certain embodiments, a library controller performs step 615. In certain embodiments, one or more accessor controllers perform step 615.

In step 620, Applicants' data storage and retrieval system receives the (i)th request from one or more host computers to mount a certain category of information storage media. In order to respond to the host request, in step 625 Applicants' method performs the (i)th query of the data storage and retrieval system database to determine which one or more physical/logical volumes match the host's category request. In certain embodiments, a storage management program makes the query of step 620. In certain embodiments, a library controller makes the query of step 620. In certain embodiments, one or more accessor controllers make the query of step 620.

In step 630, Applicants' method determines and saves the access time for this (i)th database query. In certain embodiments, a storage management program performs step 630. In certain embodiments, a library controller performs step 630. In certain embodiments, one or more accessor controllers perform step 630.

Applicants' method to monitor database performance includes using access time information regarding the previous (N) database queries made in response to the previous (N) category mounts. In step 635, the value of (N) is selected. In certain embodiments, a storage management program selects the value of (N). In certain embodiments, a library controller selects the value of (N). In certain embodiments, one or more accessor controllers select the value of (N). In certain embodiments, (N) is set to, for example, 100. In certain embodiments, (N) is selected from the group consisting of 25, 50, 75, 100, 125, 150, 175, and 200.

In step 640, Applicants' method selects a value for a maximum access time limit $T_{ACC-MAX}$. In certain embodiments, a storage management program selects the value of $T_{ACC-MAX}$. In certain embodiments, a library controller selects the value of $T_{ACC-MAX}$. In certain embodiments, one or more accessor controllers select the value of $T_{ACC-MAX}$. In certain embodiments, $T_{ACC-MAX}$ is set to, for example, about three (3) seconds. In certain embodiments $T_{ACC-MAX}$ is less than about three seconds. In certain embodiments, $T_{ACC-MAX}$ is greater than about three seconds.

In step 645, Applicants' method determines the average access time, $T_{ACC-AVG(N)}$, by averaging access times $T_{ACC}(i)$ for each of the (i) queries of the database in response the previous (N) category mounts. In certain embodiments, a storage management program performs step 640. In certain embodiments, a library controller performs step 640. In certain embodiments, one or more accessor controllers perform step 640.

In step 650, Applicants' method determines if $T_{ACC-AVG(N)}$ is greater than $T_{ACC-MAX}$. In certain embodiments, a storage management program performs step 650. In certain embodiments, a library controller performs step 650. In certain embodiments, one or more accessor controllers perform step 650.

In the event Applicants' method determines in step 650 that $T_{ACC-AVG(N)}$ is not greater than $T_{ACC-MAX}$, then Applicants' method transitions from step 650 to step 655, wherein (i) is set to (i)+1 in step 655. Applicants' method then transitions from step 655 to step 620.

Alternatively, if Applicants' method determines in step 650 that $T_{ACC-AVG(M)}$ is greater than $T_{ACC-MAX}$, then Applicants' method transitions from step 650 to step 660 wherein database maintenance is performed immediately. In certain embodiments, the database maintenance of step 660 includes rebuilding database statistics, rebuilding database indices, and the like. In certain embodiments, the database maintenance of step 660 includes defragmenting the database. After performing database maintenance in step 660, Applicants' method transitions to step 665 wherein (i) is reset to 1. Thereafter, Applicants' method transitions to step 620.

In certain embodiments, one or more individual steps in Applicants' method recited in FIG. 6 may be combined, eliminated, or reordered. For example, one embodiment of Applicants' method includes steps 615, 635, 640, 645, 650, 655, 660, and 665.

Figure 7:
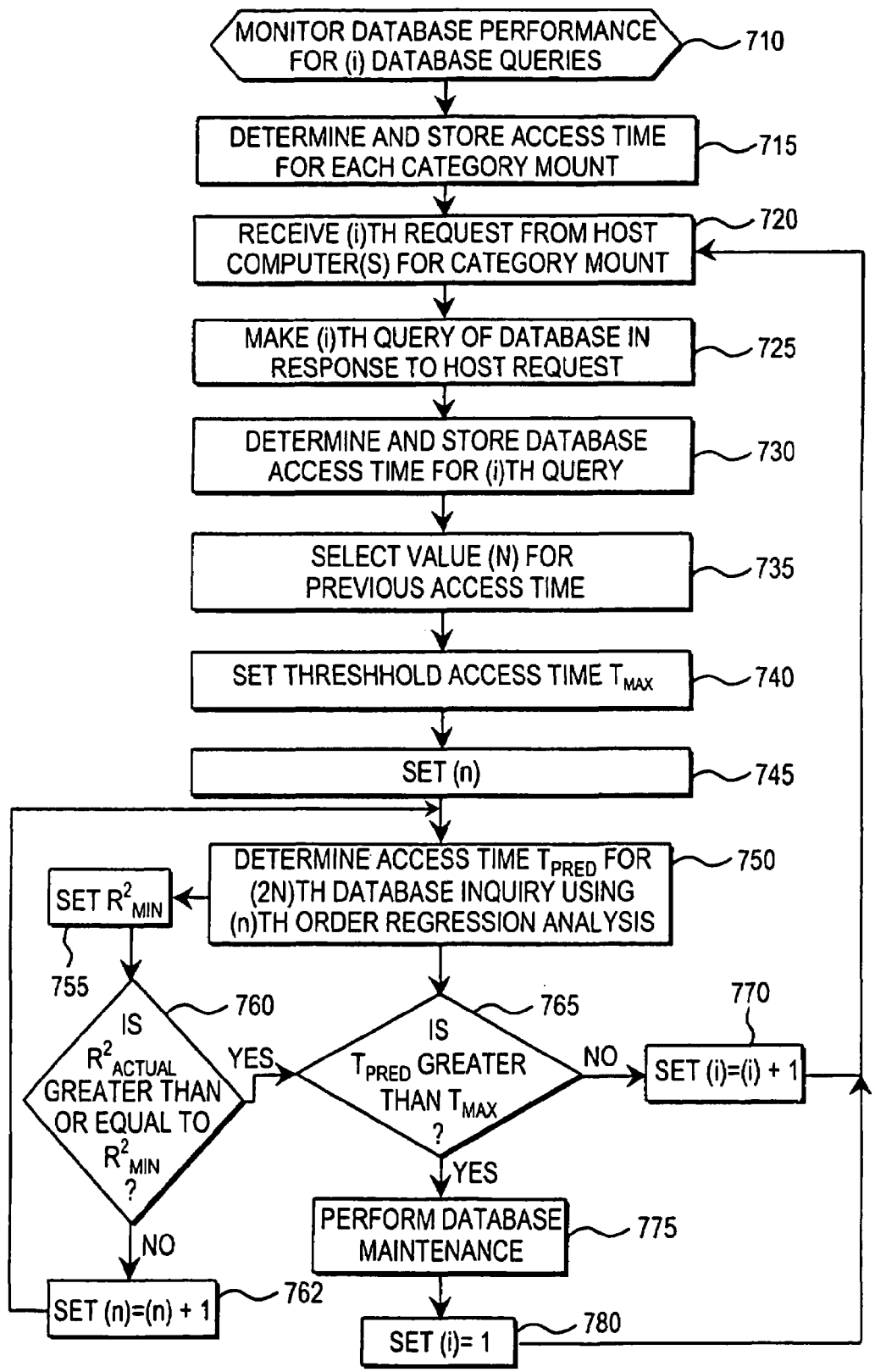
FIG. 7 is a flowchart summarizing the steps in a second embodiment of Applicants' method to monitor database performance and to perform unscheduled database maintenance.

FIG. 7 summarizes the steps in an alternative method to monitor database performance and to perform unscheduled database maintenance. Steps 710, 715, 720, 725, 730, 735, and 740 parallel steps 610, 615, 620, 625, 630, 635, and 640, described above.

In step 745, Applicants' method selects an "order" for the regression analysis of step 750. For example, if (n) is set to 1 in step 745, then Applicants' method utilizes a first order regression analysis in step 750. In step 750, Applicants' method calculates a predicted access time for the (2N)th database access based upon the actual access times for the previous (N) accesses. Referring to FIG. 8, Column 820 of Table 800 recites actual access times for the previous 25 database queries in response to the previous 25 category mounts. The actual access time data recited in Column 820 is used to predict access times for the next 25 category mounts. The data in Column 830 comprises calculated access times for the previous 25 actual category mounts, i.e. Access Request Numbers 1 through 25, and for the next 25 mounts, i.e. Access Request Numbers 26 through 50.

Referring now to FIG. 9, curve 910 graphically depicts the actual access time data of Table 800 for actual database queries 1 through 25. Curve 920 graphically depicts "predicted" values for the actual access times of column 820 (FIG. 8), and for future database access events 26 through 50. Curve 920 comprises a straight line. In certain embodiments, Applicants' method utilizes a linear regression analysis of the previous (N) access times to predict access times (N+1) through (2N), i.e. (n)=1. As those skilled in the art will appreciate, a regression analysis using the relationship Y=mX+b comprises a "linear" regression analysis. Such a linear regression analysis of the actual access times 1 through 25, where Y comprises the access time, X is the database query number, m is the slope of the curve, and b comprises the Y axis intercept, yields the "prediction" of access times 1 through 50 shown in FIG. 9. In certain embodiments, Applicants' method utilizes a higher order relationship between X and Y to predict future access times. In certain embodiments, Applicants' method employs a mathematical relationship wherein $Y=aX^2+bX+c$, i.e. (n)=2. As those skilled in the art will appreciate, such an analysis comprises a quadratic regression analysis. In certain embodiments, Applicants' method employs a mathematical relationship wherein $Y=aX^3+bX^2+cX+d$, i.e. (n)=3. As those skilled in the art will appreciate, such an analysis comprises a cubic regression analysis. In certain embodiments, Applicants' method utilizes yet higher order regression analyses.

In certain embodiments, Applicants' method transitions from step 750 to step 765 wherein the prediction of step 750 is used. In certain embodiments, Applicants' method transitions from step 750 to steps 755 and 760 wherein the "quality" of the prediction made in step 750 is first determined prior to using that prediction in step 765.

As those skilled in the art will appreciate, R squared is a measure of the relative predictive power of a model. R squared is a descriptive measure between 0 and 1. The closer the R squared value for a model is to 1.0, the closer the "fit" between better the observed Y values and calculated Y values, where Y is a function of X. A value of R squared value of 1.0 means the regression analysis provides a perfect model.

In certain embodiments of Applicants' method, in step 755 a minimum value of R squared is set. In certain embodiments, the minimum R squared value is set 0.90. In certain embodiments, the minimum R squared value is set 0.95. In certain embodiments, the minimum R squared value is set 0.99.

In step 760, Applicants' method determines if the R squared value for the prediction of step 750 is equal to or greater than the minimum R squared value set in step 755. If the actual R squared value is equal to, or greater than, the minimum R squared value, then Applicants' method transitions from step 760 to step 765. Alternatively, however, if Applicants' method determines in step 760 that the R squared value for the prediction of step 750 is less than the minimum R squared value set in step 755, then Applicants' method transitions to step 762 wherein the value of (n) is incremented. Thereafter, Applicants' method transitions to step 750 wherein another prediction is made using a higher order regression analysis. In certain embodiments, for example, if a linear regression analysis fails to achieve an R squared of at least 0.90, then a quadratic analysis is performed. If that quadratic analysis fails to achieve an R squared value of at least 0.90, then a cubic analysis is performed, and so on.

In step 765, Applicants' method determines if the predicted database access time for the (2N)th database query is greater than the maximum access time set in step 740. If Applicants' method determines that the predicted database access time for the (2N)th database query is not greater than the maximum access time set in step 740, then Applicants' method transitions from step 765 to step 770 wherein (i) is set to (i)+1. Applicants' method thereafter transitions from step 770 to step 720.

Alternatively, if Applicants' method determines that the predicted database access time for the (2N)th database query is greater than the maximum access time set in step 740, then Applicants' method transitions from step 765 to step 775 wherein database maintenance is immediately performed. Thereafter, Applicants' method transitions from step 775 to step 780 wherein (i) is reset to 1. Applicants' method transitions from step 780 to step 720.

In certain embodiments, one or more individual steps in Applicants' method recited in FIG. 7 may be combined, eliminated, or reordered. For example, one embodiment of Applicants' method includes steps 715, 735, 740, 745, 750, 755, 760, and 765.

Applicants' invention further includes an article of manufacture comprising a computer useable medium having computer readable program code disposed therein to monitor database performance and to perform database maintenance if the database access times exceed a threshold value, wherein the database comprises information relating to one or more information storage media disposed in the data storage and retrieval system. Applicants' data storage and retrieval system 100 and 200 each comprise such an article of manufacture. Applicants' invention further includes a computer program product usable with a programmable computer processor having computer readable program code embodied therein to monitor database performance and to perform database maintenance if the database access times exceed a threshold value, wherein that database comprises information relating to one or more information storage media disposed in a data storage and retrieval system.

Applicants' invention further includes a method to opportunistically rebuild database indices if database performance is degraded. Library controller 160 (FIG. 1) includes an operating system. Each time that operating system is started, Applicants' method queries the library database to determine if database performance is acceptable. In certain embodiments, during operating system start-up, Applicants' method determines if a database query to identify one or more physical/logical volumes based upon specified categorical search information exceeds a predetermined threshold access time limit $T_{ACC-MAX}$. In certain embodiments, $T_{ACC-MAX}$ is set to, for example, about three seconds. In certain embodiments, $T_{ACC-MAX}$ is greater than about three seconds. In certain embodiments, $T_{ACC-MAX}$ is less than about three seconds.

If the database access time measured during operating system start-up is less than $T_{ACC-MAX}$, then database maintenance is not immediately performed. Alternatively, if the database access time measured during operating system start-up is equal to, or greater than, $T_{ACC-MAX}$, then database maintenance is immediately performed.

In certain embodiments, Applicants' data storage and retrieval system includes dual library controllers. During switchover from a first library controller to a second library controller, a second operating system disposed in the second library controller is brought up, and thereafter operates the data storage and retrieval system. During start-up of the second operating system, Applicants' method examines the library database to determine if database performance is acceptable. In certain embodiments, during start-up of the second operating system, Applicants' method determines if a database query to identify one or more physical/logical volumes based upon specified categorical search information exceeds a predetermined threshold access time limit $T_{ACC-MAX}$. In certain embodiments, $T_{ACC-MAX}$ is set to, for example, about three seconds. In certain embodiments, $T_{ACC-MAX}$ is greater than about three seconds. In certain embodiments, $T_{ACC-MAX}$ is less than about three seconds.

If the database access time measured during second operating system start-up is less than $T_{ACC-MAX}$, then database maintenance is not immediately performed. Alternatively, if the database access time measured during second operating system start-up is equal to, or greater than, $T_{ACC-MAX}$, then database maintenance is immediately performed.

Applicants' invention further includes an article of manufacture comprising a computer useable medium having computer readable program code disposed therein to opportunistically rebuild database indices during operating system start-up in the event database performance is determined to be unacceptable. Applicants' data storage and retrieval system 100 and 200 each comprise such an article of manufacture. Applicants' invention further includes a computer program product usable with a programmable computer processor having computer readable program code embodied therein to rebuild database indices during operating system start-up in the event database performance is determined to be unacceptable.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to schedule database maintenance, comprising the steps of:

selecting a first time period, wherein said first time period equals twenty-four hours, wherein said first time period comprises 48 first time intervals;

commencing said first time period at a first time and ending said first time period at a third time;

performing one or more database queries during said first time period;

recording the number of database queries performed during each of said two or more first time intervals;

determining the least utilized first time interval, wherein said least utilized first time interval comprises the one of said two or more first time intervals during which the fewest database queries were performed, wherein said least utilized first time interval commenced at a second time;

calculating a first time difference between said first time and said second time;

scheduling said database maintenance at a fourth time, wherein said fourth time equals said third time plus said first time difference.

2. The method of claim 1, wherein said database comprises the identity, location, and category of one or more information storage media moveably disposed in a data storage and retrieval system.

3. The method of claim 2, wherein said data storage and retrieval system comprises one or more data storage devices, and wherein said data storage and retrieval system is capable of communicating with one or more host computers.

4. The method of claim 3, further comprising the steps of:
receiving a request from said one or more host computers to mount a first information storage medium in one of said one or more data storage devices, wherein said first information storage medium comprises one of said one or more information storage media; and
identifying said first information storage medium by performing one of said one or more database queries.

5. The method of claim 4, wherein said request comprises category information specific to said first information storage medium.

6. The method of claim 5, further comprising the step of forming a prediction of future database usage based upon said number of database inquiries performed during said first time period.

7. The method of claim 1, further comprising the steps of:
commencing a second time period at said third time, wherein said second time period comprises two or more second time intervals, and wherein said second time period ends at a sixth time;
performing one or more second database queries during said second time period;
recording the number of said second database queries performed during each of said two or more second time intervals;
determining the least utilized second time interval, wherein said least utilized second time interval comprises the one of said two or more second time intervals during which the fewest second database inquiries were performed, wherein said least utilized second time interval commenced at a fifth time;
calculating a second time difference between said third time and said fifth time;
scheduling second database maintenance at a seventh time, wherein said seventh time equals said sixth time plus said second time difference.

8. The method of claim 7, further comprising the steps of:
forming a first prediction of future database usage based upon said number of database inquiries performed during said first time period; and
revising said prediction based upon said number of second database inquiries performed during said second time period.

9. A method to schedule database maintenance, wherein said database comprises information relating to one or more information storage media disposed in a data storage and retrieval system, wherein said data storage and retrieval system is capable of communication with one or more host computers, said method comprising the following steps in the following order:

(1) selecting a time interval $\Delta T$, wherein $\Delta T$ equals 24 hours divided by (N),
wherein (N) is greater than or equal to 2;

(2) setting (j)=1;
(3) commencing time period P(j) at time T(1)(j), wherein time period P(j) comprises a plurality of time intervals $\Delta T(i)(j)$, wherein (i) is greater than or equal to 1 and less than or equal to N;
(4) performing a plurality of database queries during said time period P(j), and recording the number of database queries R(i)(j) performed during each of said time intervals $\Delta T(i)(j)$;
(5) establishing the maintenance time interval $\Delta T_{(MAIN)}$ (2), wherein the value of $_{(MAIN)}$ is set to the value of (i) for the one of said plurality of time intervals $\Delta T(i)(1)$ during which the fewest number of database inquiries R(i)(1) were performed;
(6) setting $R_{REF}$ equal to $R_{(MIN}-1)(1)$, wherein $R_{(MIN}-1)$(1) comprises the number of database inquiries performed during the time interval $\Delta T_{(MIN}-1)(1)$, wherein $\Delta T_{(MIN}-1)(1)$ comprises the time interval immediately preceding the one of said plurality of time intervals $\Delta T(i)(1)$ during which the fewest number of database inquiries R(i)(1) were performed;
(7) setting (j)=(j)+1;
(8) commencing time period P(j) at time T(1)(j), wherein time period P(j) comprises a plurality of time intervals $\Delta T(i)(j)$, wherein (i) is greater than or equal to 1 and less than or equal to N;
(9) recording the number of database queries R(i)(j) performed during each of said time intervals $\Delta T(i)(j)$; and
(10) determining if $R_{(MIN}-1)(j)$ is greater than about $1.1*R_{REF}$;
(11) operative if $R_{(MIN}-1)(j)$ is not greater than about $1.1*R_{REF}$:
performing database maintenance during time interval $\Delta T_{(MAIN)}(j)$; and
repeating steps (7), (8), (9), (10)(11), and (12);
(12) operative if $R_{(MIN}-1)(j)$ is greater than about $1.1*R_{REF}$:
determining $\Delta T_{(MIN)}(j)$, wherein $\Delta T_{(MIN)}(j)$ comprises the one of said plurality of time intervals $\Delta T(i)(j)$ during which the fewest number of database inquiries R(i)(j) were performed;
setting maintenance time interval $\Delta T_{(MAIN)}(j+1)$, wherein the value of $_{(MAIN)}$ is set to the value of (i) for the one of said plurality of time intervals $\Delta T(i)(j)$ during which the fewest number of database inquiries R(i)(j) were performed;
setting $R_{REF}$ equal to $R_{(MIN}-1)(j)$, wherein $R_{(MIN}-1)(j)$ comprises the number of database inquiries performed during the time interval $\Delta T_{(MIN}-1)(j)$, wherein $\Delta T_{(MIN}-1)(j)$ comprises the time interval immediately preceding the one of said plurality of time intervals $\Delta T(i)(j)$ during which the fewest number of database inquiries R(i)(j) were performed repeating steps (7), (8), (9), (10), (11), and (12).

10. A data storage and retrieval system comprising a computer useable medium having computer readable program code disposed therein to schedule database maintenance, wherein said database comprises information relating to one or more information storage media disposed in said data storage and retrieval system, the computer readable program code comprising a series of computer readable program steps to effect:
selecting a first time period, wherein said first time period equals twenty-four hours, wherein said first time period comprises 48 first time intervals;

commencing said first time period at a first time and ending said first time period at a third time;

performing one or more database queries during said first time period;

recording the number of database queries performed during each of said two or more first time intervals;

determining the least utilized first time interval, wherein said least utilized first time interval comprises the one of said two or more first time intervals during which the fewest database queries were performed, wherein said least utilized first time interval commenced at a second time;

calculating the a first time difference between said first time and said second time;

scheduling said database maintenance at a fourth time, wherein said fourth time equals said third time plus said first time difference.

11. The data storage and retrieval system of claim 10, wherein said database comprises the identity, location, and category of one or more information storage media moveably disposed in said data storage and retrieval system.

12. The data storage and retrieval system of claim 11, wherein said data storage and retrieval system comprises one or more data storage devices, and wherein said data storage and retrieval system is capable of communicating with one or more host computers, said computer readable program code comprising a series of computer readable program steps to effect:

receiving a request from said one or more host computers to mount a first information storage medium in one or said one or more data storage devices, wherein said first information storage medium comprises one of said one or more information storage media; and identifying said first information storage medium by performing one of said one or more database queries.

13. The data storage and retrieval system of claim 12, wherein said request comprises category information specific to said first information storage medium.

14. The data storage and retrieval system of claim 13, wherein said computer readable program code further comprises a series of computer readable program steps to effect forming a prediction of future database usage based upon said number of database inquiries performed during said first time period.

15. The data storage and retrieval system of claim 10, wherein said computer readable program code further comprises a series of computer readable program steps to effect:

commencing a second time period at said third time, wherein said second time period comprises two or more second time intervals, and wherein said second time period ends at a sixth time;

performing one or more second database queries during said second time period;

recording the number of said second database queries performed during each of said two or more second time intervals;

determining the least utilized second time interval, wherein said least utilized second time interval comprises the one of said two or more second time intervals during which the fewest second database inquiries were performed, wherein said least utilized second time interval commenced at a fifth time;

calculating the a second time difference between said third time and said fifth time;

scheduling second database maintenance at a seventh time, wherein said seventh time equals said sixth time plus said second time difference.

16. The data storage and retrieval system of claim 15, wherein said computer readable program code further comprises a series of computer readable program steps to effect:

forming a first prediction of future database usage based upon said number of database inquiries performed during said first time period; and revising said prediction based upon said number of second database inquiries performed during said second time period.

17. A data storage and retrieval system comprising a computer useable medium having computer readable program code disposed therein to schedule database maintenance, wherein said database comprises information relating to one or more information storage media disposed in said data storage and retrieval system, the computer readable program code comprising a series of computer readable program steps to effect:

(1) selecting a time interval $\Delta T$, wherein $\Delta T$ equals 24 hours divided by (N), wherein (N) is greater than or equal to 2;

(2) setting (j)=1;

(3) commencing time period P(j) at time T(1)(j), wherein time period P(j) comprises a plurality of time intervals $\Delta T(i)(j)$, wherein (i) is greater than or equal to 1 and less than or equal to (N);

(4) performing a plurality of database queries during said time period P(j), and recording the number of database queries R(i)(j) performed during each of said time intervals $\Delta T(i)(j)$;

(5) establishing the maintenance time interval $\Delta T_{(MAIN)}$ (2), wherein $_{(MAIN)}$ is set to the value of (i) for the one of said plurality of time intervals $\Delta T(i)(1)$ during which the fewest number of database inquiries R(i)(1) were performed;

(6) setting $R_{REF}$ equal to $R(_{MIN}-1)(1)$, wherein $R(_{MIN}-1)$ (1) comprises the number of database inquiries performed during the time interval $\Delta T(_{MIN}-1)(1)$, wherein $\Delta T(_{MIN}-1)(1)$ comprises the time interval immediately preceding the one of said plurality of time intervals $\Delta T(i)(1)$ during which the fewest number of database inquiries R(i)(1) were performed;

(7) setting (j)=(j)+1;

(8) commencing time period P(j) at time T(1)(j), wherein time period P(j) comprises a plurality of time intervals $\Delta T(i)(j)$, wherein (i) is greater than or equal to 1 and less than or equal to (N);

(9) recording the number of database queries R(i)(j) performed during each of said time intervals $\Delta T(i)(j)$; and

(10) determining if $R(_{MIN}-1)(j)$ is greater than about $1.1*R_{REF}$;

(11) operative if $R(_{MIN}-1)(j)$ is not greater than about $1.1*R_{REF}$.

performing database maintenance during time interval $\Delta T_{(MAIN)}(j)$; and repeating steps (7), (8), (9), (10)(11), and (12);

(12) operative if $R(_{MIN}-1)(j)$ is greater than about $1.1*R_{REF}$:

determining $\Delta T_{(MIN)}(j)$, wherein $\Delta T_{(MIN)}(j)$ comprises the one of said plurality of time intervals $\Delta T(i)(j)$ during which the fewest number of database inquiries R(i)(j) were performed;

setting maintenance time interval $\Delta T_{(MAIN)}(j+1)$, wherein the value of $_{(MAIN)}$ is set to the value of (i) for the one of said plurality of time intervals $\Delta T(i)(j)$ during which the fewest number of database inquiries R(i)(j) were performed;

setting $R_{REF}$ equal to $R_{(MIN}-1)(j)$, wherein $R_{(MIN}-1)(j)$ comprises the number of database inquiries performed during the time interval $\Delta T_{(MIN}-1)(j)$, wherein $\Delta T_{(MIN}-1)(j)$ comprises the time interval immediately preceding the one of said plurality of time intervals $\Delta T(i)(j)$ during which the fewest number of database inquiries $R(i)(j)$ were performed repeating steps (7), (8), (9), (10), (11), and (12).

18. A computer program product usable with a programmable computer processor having computer readable program code embodied therein to schedule database maintenance, wherein said database comprises information relating to one or more information storage media disposed in a data storage and retrieval system, comprising:

computer readable program code which causes said programmable computer processor to select a first time period, wherein said first time period comprises two or more first time intervals;

computer readable program code which causes said programmable computer processor to commence said first time period at a first time and ending said first time period at a third time;

computer readable program code which causes said programmable computer processor to perform one or more database queries during said first time period;

computer readable program code which causes said programmable computer processor to record the number of database queries performed during each of said two or more first time intervals;

computer readable program code which causes said programmable computer processor to determine the least utilized first time interval, wherein said least utilized first time interval comprises the one of said two or more first time intervals during which the fewest database queries were performed, wherein said least utilized first time interval commenced at a second time;

computer readable program code which causes said programmable computer processor to calculate the a first time difference between said first time and said second time;

computer readable program code which causes said programmable computer processor to schedule said database maintenance at a fourth time, wherein said fourth time equals said third time plus said first time difference;

computer readable program code which causes said programmable computer processor to receive a request from said one or more host computers to mount a first information storage medium in one of said one or more data storage devices, wherein said first information storage medium comprises one of said one or more information storage media;

computer readable program code which causes said programmable computer processor to identify said first information storage medium by performing one of said one or more database queries;

computer readable program code which causes said programmable computer processor to form a prediction of future database usage based upon said number of database inquiries performed during said first time period.

19. The computer code product of claim 18, further comprising computer readable program code which causes said programmable computer processor to commence a second time period at said third time, wherein said second time period comprises two or more second time intervals, and wherein said second time period ends at a sixth time;

computer readable program code which causes said programmable computer processor to perform one or more second database queries during said second time period;

computer readable program code which causes said programmable computer processor to record the number of said second database queries performed during each of said two or more second time intervals;

computer readable program code which causes said programmable computer processor to determine the least utilized second time interval, wherein said least utilized second time interval comprises the one of said two or more second time intervals during which the fewest second database inquiries were performed, wherein said least utilized second time interval commenced at a fifth time;

computer readable program code which causes said programmable computer processor to calculate a second time difference between said third time and said fifth time;

computer readable program code which causes said programmable computer processor to schedule second database maintenance at a seventh time, wherein said seventh time equals said fifth time plus said second time difference.

20. The computer code product of claim 19, further comprising computer readable program code which causes said programmable computer processor to revise said prediction based upon said number of second database inquiries performed during said second time period.

* * * * *